3,179,557
N-METHYL-PHENYL CARBAMATES FOR CONTROLLING ANIMAL PESTS

Arnold Hausweiler and Klaus Schwarzer, Cologne-Flittard, Wolfgang Behrenz, Wuppertal-Elberfeld, and Günter Unterstenhöfer, Opladen, Germany, assignors to Farbenfabriken Bayer Aktiengesellschaft, Leverkusen, Germany, a corporation of Germany
No Drawing. Filed Jan. 9, 1962, Ser. No. 165,214
Claims priority, application Germany, Jan. 27, 1961, F 33,079
2 Claims. (Cl. 167—30)

The present invention relates to a method of controlling animal pests by applying N-methyl-phenyl carbamates in a toxic amount, and to a pesticidal composition containing these compounds as an active ingredient.

In addition to the large groups of organic phosphorous compounds and chlorinated hydrocarbons, carbamates of naphthols and phenols have recently gained increasing importance for combating insects which are harmful to plants.

The carbamates of phenol and of some substituted phenols possess an insecticidal activity chiefly against houses flies and in admixtures with other insecticides these compounds exhibit a synergistic activity. The N-methyls and N,N-dimethyl-carbamates of naphthols possess an insecticidal activity while having a low toxicity towards warm-blooded animals (see contribution from Boyce Thompson Institute, vol. 18, No. 11, 1957, and DAS No. 1,037,195). α-Naphthyl-N-methyl-carbamate has also become known for combating ecto-parasites on domestic animals.

There has been found a very effective class of carbamates containing a substituted phenol which may be represented by the formula

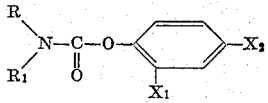

wherein R is a member of the group consisting of hydrogen and the methyl radical, $R_1$ is the methyl radical and $X_1$ and $X_2$ are selected from the group consisting of hydrogen atoms, halogen atoms, the cyclohexyl, an alkyl and an alkoxy radical, at least one of which is the cyclohexyl radical. Specific compounds are:

2-cyclohexylphenyl-N-methyl-carbamate,
2-cyclohexylphenyl-N-dimethyl-carbamate,
4-cyclohexylphenyl-N-methyl-carbamate,
2-cyclohexyl-4-chloro-phenyl-N-methyl-carbamate,
4-cyclohexyl-2-chloro-phenyl-N-dimethyl-carbamate,
2-cyclohexyl-4-methyl-phenyl-N-methylcarbamate,
4-cyclohexyl-2-methoxy-phenyl-N-dimethyl-carbamate.

This class of N-methyl- and N,N-dimethyl-carbamates of cyclohexyl phenols possesses surprisingly good activities against pests, especially against ecto-parasites of domestic animals, which exceeds that of commercial products, for example α-naphthyl-N-methyl-carbamate.

It is an object of this invention to provide pesticidal compounds of enhanced killing power. These compounds are relatively high toxic pesticides, but the estimate toxicity to warm-blooded animals is greatly reduced, because of the lower concentration of the toxic carbamates.

An activity of carbamates in combating ectoparasites has hitherto been known only for a naphthyl-N-methyl-carbamate. However, this compound has only a relatively poor activity against pests of this type, for example, against the tropical and sub-tropical ticks widely spread there on domestic animals. By contrast, the compounds according to the invention act more rapidly and at lower concentrations without being more toxic for animals.

As compounds according to the invention there are to be considered, in particular, N-methyl- and N,N-dimethyl-carbamates of phenols which contain a cyclohexyl group in the o- or p-position and optionally one or more alkyl, alkoxy and/or halogen radicals as further substituents. Several methods are available for preparing these compounds, for example, by converting phenols into halocarbonic acid esters and subsequent reaction with mono- or dimethylamine, or by reacting the phenols with mono- or dimethyl-carbamic acid halides, and also by reacting the phenols with N-methyl-isocyanate.

The compounds according to the invention can be used as such, for example, in form of an aqueous solution or suspension, or also in combination with other compounds possessing, for example, a less rapid but long-persistant activity or in the form of dry compositions containing carriers, extenders and wetting agents.

The following examples are given for the purpose of illustrating the present invention:

Example 1

Sucked full adult female ticks of the species *Boophilus microplus* are immersed for 1 minute in aqueous solutions or suspensions of carbamates at various concentrations. The following results of destruction are found 5 hours after treatment:

| Preparation | Active substance, percent | Destroyed, percent |
|---|---|---|
| 2-cyclohexyl-phenyl-N-methyl-carbamate | 0.1 | 100 |
| | 0.05 | 100 |
| | 0.025 | 100 |
| | 0.01 | 90 |
| α-Naphthyl-N-methyl-carbamate | 0.3 | 100 |
| | 0.15 | 80 |
| | 0.05 | 60 |
| | 0.025 | 20 |

Example 2

Sucked full adult ticks of the species *Rhipicephalus evertri* are immersed for 1 minute in aqueous solutions or suspensions of carbamates at various concentrations. The following results of destruction are established 4 hours after treatment:

| Preparation | Active substance, percent | Destroyed, percent |
|---|---|---|
| 2-cyclohexyl-phenyl-N-methyl-carbamate | 0.2 | 100 |
| | 0.1 | 100 |
| | 0.05 | 50 |
| | 0.025 | 10 |
| Mixture of about 70% of 2-cyclohexyl-phenyl-N-methyl-carbamate and 30% of 4-cyclohexyl-phenyl-N-methyl-carbamate | 0.2 | 100 |
| | 0.1 | 100 |
| | 0.05 | 100 |
| | 0.025 | 40 |
| α-Naphthyl-N-methyl-carbamate | 0.2 | 80 |
| | 0.1 | 20 |
| | 0.05 | 0 |

Example 3

Sheep which have been infested by *Haemonchus contortus* are given per os an emulsion of 2-cyclohexylphenyl-N-methyl-carbamate. The results of the tests can be seen from the following table:

| No. of sheep | Dose administered (mg./kg.) | Destruction of pests in percent |
|---|---|---|
| 1 | 50 | 85 |
| 1 | 50 | 98 |

What is claimed is:

1. A method for the control and treatment of animal ecto parasites comprising contacting said parasites with an active amount of 4-cyclohexyl-2-methoxy-phenyl-N-dimethyl-carbamate.

2. A pesticidal composition consisting essentially of about .2–.025% by weight of 4-cyclohexyl-2-methoxy-phenyl-N-dimethyl-carbamate, as active ingredients, with a carrier and a wetting agent.

References Cited by the Examiner

UNITED STATES PATENTS

| | | | |
|---|---|---|---|
| 2,483,693 | 10/49 | Dobratz | 167—30 |
| 2,854,374 | 9/58 | Huisman et al. | 167—30 |
| 2,945,877 | 6/60 | Zima et al. | 167—30 |
| 2,955,070 | 10/60 | Jones et al. | 167—30 |
| 2,992,966 | 7/61 | Jacobi et al. | 167—30 |
| 3,062,707 | 11/62 | Kohn et al. | 167—30 |

OTHER REFERENCES

Kolbezen et al.: J. Ag. and Food Chem., vol. 2, No. 17 (1954), pp. 864–870.

LEWIS GOTTS, *Primary Examiner.*

FRANK CACCIAPAGLIA, JR., JULIAN S. LEVITT, IRVING MARCUS, *Examiners.*